United States Patent
Aleman et al.

(10) Patent No.: US 10,248,485 B2
(45) Date of Patent: Apr. 2, 2019

(54) DUAL PHYSICAL-CHANNEL SYSTEMS FIRMWARE INITIALIZATION AND RECOVERY

(71) Applicant: International Business Machines Corporation, Armonk, NY (US)

(72) Inventors: Enrique Aleman, Dublin, CA (US); Clinton E. Bubb, Pleasant Valley, NY (US); Ying-yeung Li, Pleasant Valley, NY (US); Myron T. Wisniewski, Catskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 15/381,269

(22) Filed: Dec. 16, 2016

(65) Prior Publication Data

US 2018/0173582 A1    Jun. 21, 2018

(51) Int. Cl.
*G06F 11/00* (2006.01)
*G06F 11/07* (2006.01)

(52) U.S. Cl.
CPC ...... *G06F 11/0736* (2013.01); *G06F 11/0751* (2013.01); *G06F 11/0793* (2013.01)

(58) Field of Classification Search
USPC ......................................................... 714/15
See application file for complete search history.

(56) References Cited

U.S. PATENT DOCUMENTS

| | | | |
|---|---|---|---|
| 7,549,090 B2 | 6/2009 | Bailey et al. | |
| 2004/0230713 A1 | 11/2004 | Brice, Jr. et al. | |
| 2008/0263238 A1 | 10/2008 | Brice et al. | |
| 2011/0320670 A1 | 12/2011 | Bayer et al. | |
| 2012/0266015 A1* | 10/2012 | Taylor | H04L 12/5601 714/4.11 |
| 2013/0013905 A1* | 1/2013 | Held | G06F 21/575 713/2 |
| 2015/0067019 A1* | 3/2015 | Balko | H04L 67/10 709/202 |
| 2016/0043938 A1* | 2/2016 | Colpo | G06F 21/70 714/4.12 |

OTHER PUBLICATIONS zEnterprise BC12; International Business Machines Corporation; http://www-01.ibm.com/support/docview.wss?uid=isg21bf2005026fef8aaf85257ba60050e202&aid=1; Jan. 21, 2014; pp. 1-196.

* cited by examiner

*Primary Examiner* — Sarai E Butler
(74) *Attorney, Agent, or Firm* — Cantor Colburn LLP; Steven Chiu (57) ABSTRACT

Aspects of the present invention include a method, system and computer program product. The method includes a processor operating first and second physical channel identifier (PCHID) devices comprised of a plurality of functional logic components, wherein one or more of the functional logic components are specific to one or more of the first and second PCHIDs and wherein one or more of the functional logic components are in common and not specific to one or more of the first and second PCHIDs; determining that an error condition exists in the first PCHID or the second PCHID; executing a recovery method to remove the error condition from the first PCHID or the second PCHID in which the error condition exists; and executing, by the processor, an initialization method for both of the first and second PCHIDs.

20 Claims, 6 Drawing Sheets

DUAL PHYSICAL-CHANNEL SYSTEMS FIRMWARE INITIALIZATION AND RECOVERY

BACKGROUND

The present invention relates to computer or processing firmware, and more specifically, to a method, system and computer program product that provides for the initialization and recovery of a dual physical channel identifier (PCHID) device hardware architecture from various errors affecting a single specific one of the two PCHID devices or affecting both PCHID devices in common.

One of the main tasks for firmware in a dual PCHID hardware architecture ("dual PCHIDs") such as, for example, the Kraken architecture having two "partnering" PCHIDs, connected together with associated hardware logic is to synchronize the initialization and recovery of the functional hardware logic within or a part of either one or both of the PCHIDs after a common error (i.e., an error affecting both PCHIDs) or after a specific error affecting only one of the two PCHIDs. That is, a common error affects the functional hardware logic that is in common between both PCHIDs, while a specific error affects the functional hardware logic that is specific or dedicated to only one of the PCHIDs. Since both PCHID devices must be operated independently of each other, the processes or methods for initialization and recovery must be coordinated with one another and must not disrupt operations of the other PCHID in the pair.

SUMMARY

According to one or more embodiments of the present invention, a computer-implemented method includes operating, by a processor, first and second physical channel identifier (PCHID) devices comprised of a plurality of functional logic components, wherein one or more of the functional logic components are specific to one or more of the first and second PCHIDs and wherein one or more of the functional logic components are in common and not specific to one or more of the first and second PCHIDs; determining, by the processor, that an error condition exists in the first PCHID or the second PCHID; executing, by the processor, a recovery method to remove the error condition from the first PCHID or the second PCHID in which the error condition exists; and executing, by the processor, an initialization method for both of the first and second PCHIDs.

According to another embodiment of the present invention, a system includes a processor in communication with one or more types of memory, the processor configured to operate first and second physical channel identifier (PCHID) devices comprised of a plurality of functional logic components, wherein one or more of the functional logic components are specific to one or more of the first and second PCHIDs and wherein one or more of the functional logic components are in common and not specific to one or more of the first and second PCHIDs; to determine that an error condition exists in the first PCHID or the second PCHID; to execute a recovery method to remove the error condition from the first PCHID or the second PCHID in which the error condition exists; and to execute an initialization method for both of the first and second PCHIDs.

According to yet another embodiment of the present invention, a computer program product includes a non-transitory storage medium readable by a processing circuit and storing instructions for execution by the processing circuit for performing a method that includes operating first and second physical channel identifier (PCHID) devices comprised of a plurality of functional logic components, wherein one or more of the functional logic components are specific to one or more of the first and second PCHIDs and wherein one or more of the functional logic components are in common and not specific to one or more of the first and second PCHIDs; determining that an error condition exists in the first PCHID or the second PCHID; executing a recovery method to remove the error condition from the first PCHID or the second PCHID in which the error condition exists; and executing an initialization method for both of the first and second PCHIDs.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
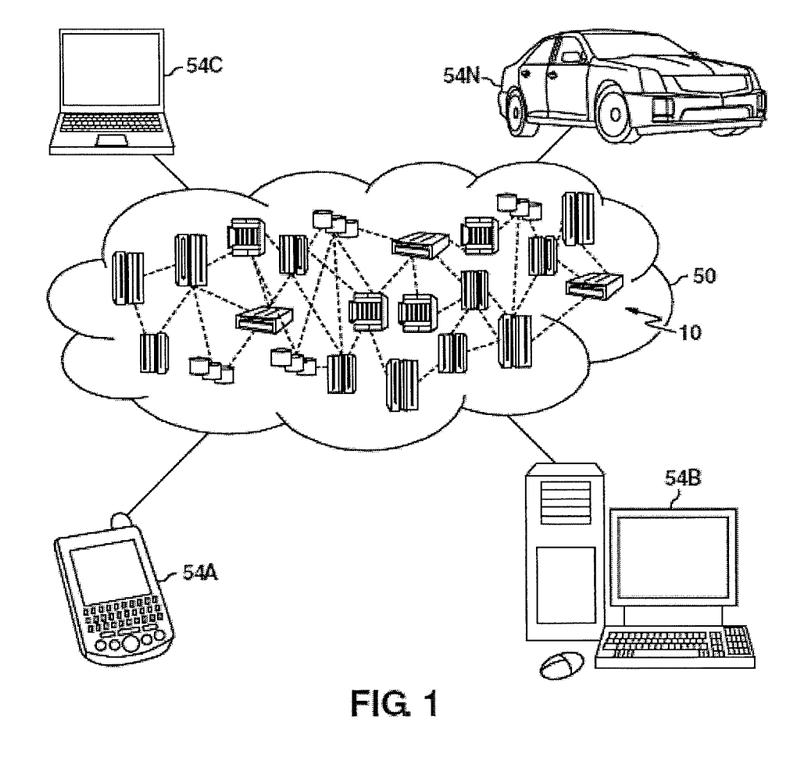
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
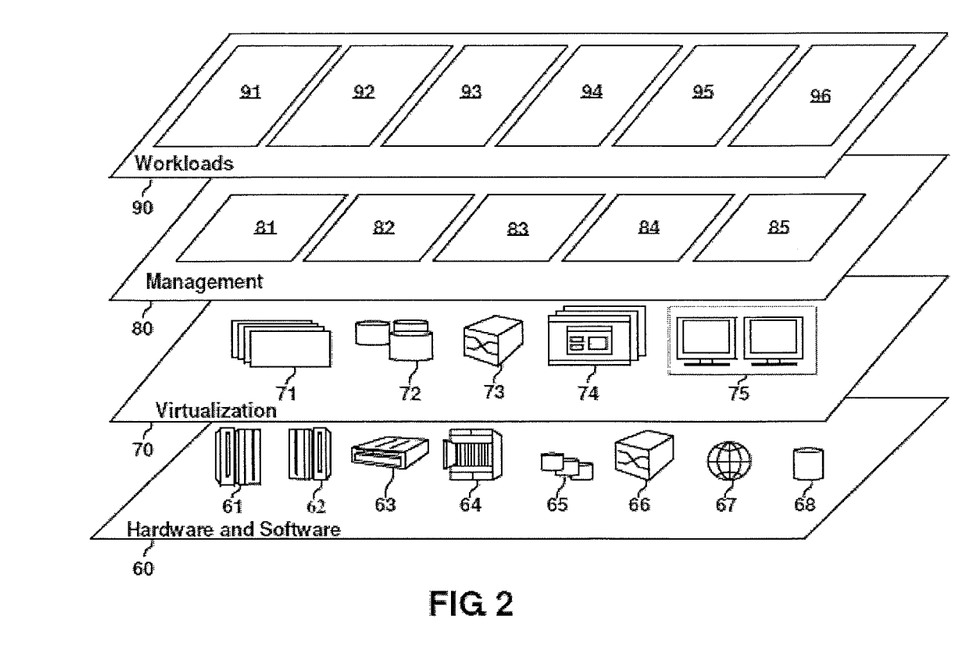
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and methods 96 for initialization and recovery of PCHID functional hardware logic within a dual physical channel PCHID hardware architecture in accordance with one or more embodiments of the present invention.

Figure 3:
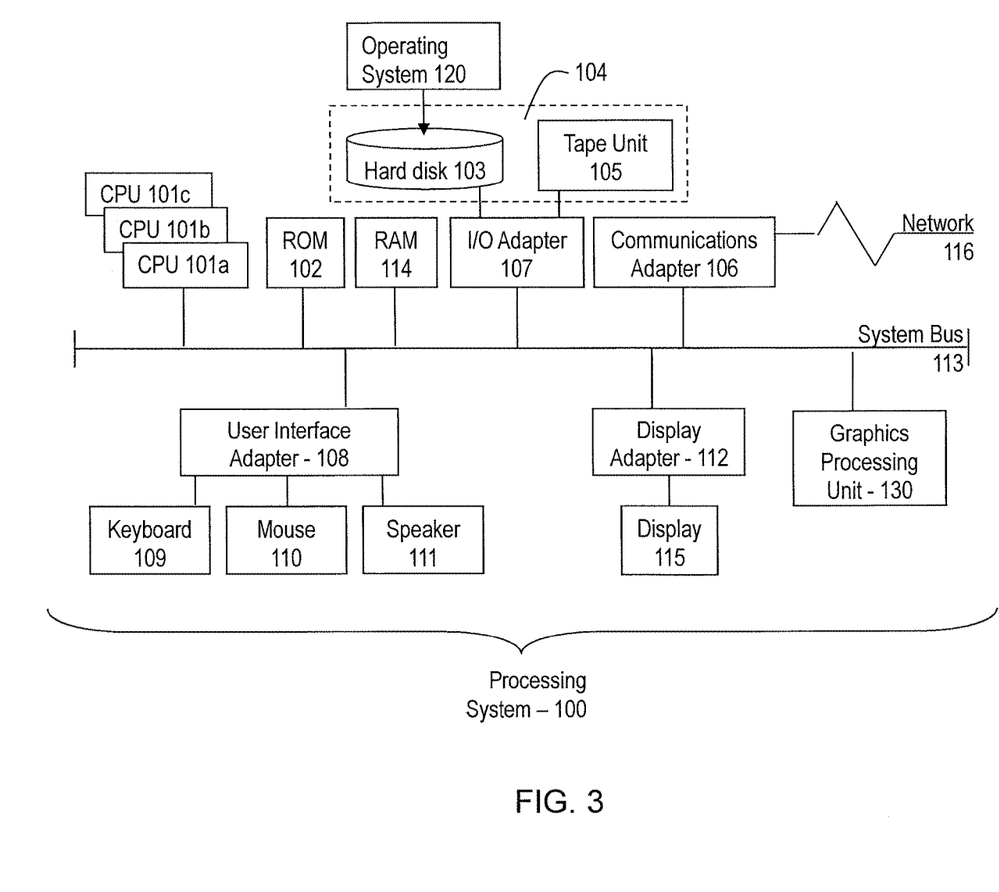
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for initialization and recovery of PCHID functional hardware logic within a dual physical channel identifier (PCHID) hardware architecture.

Figure 4:
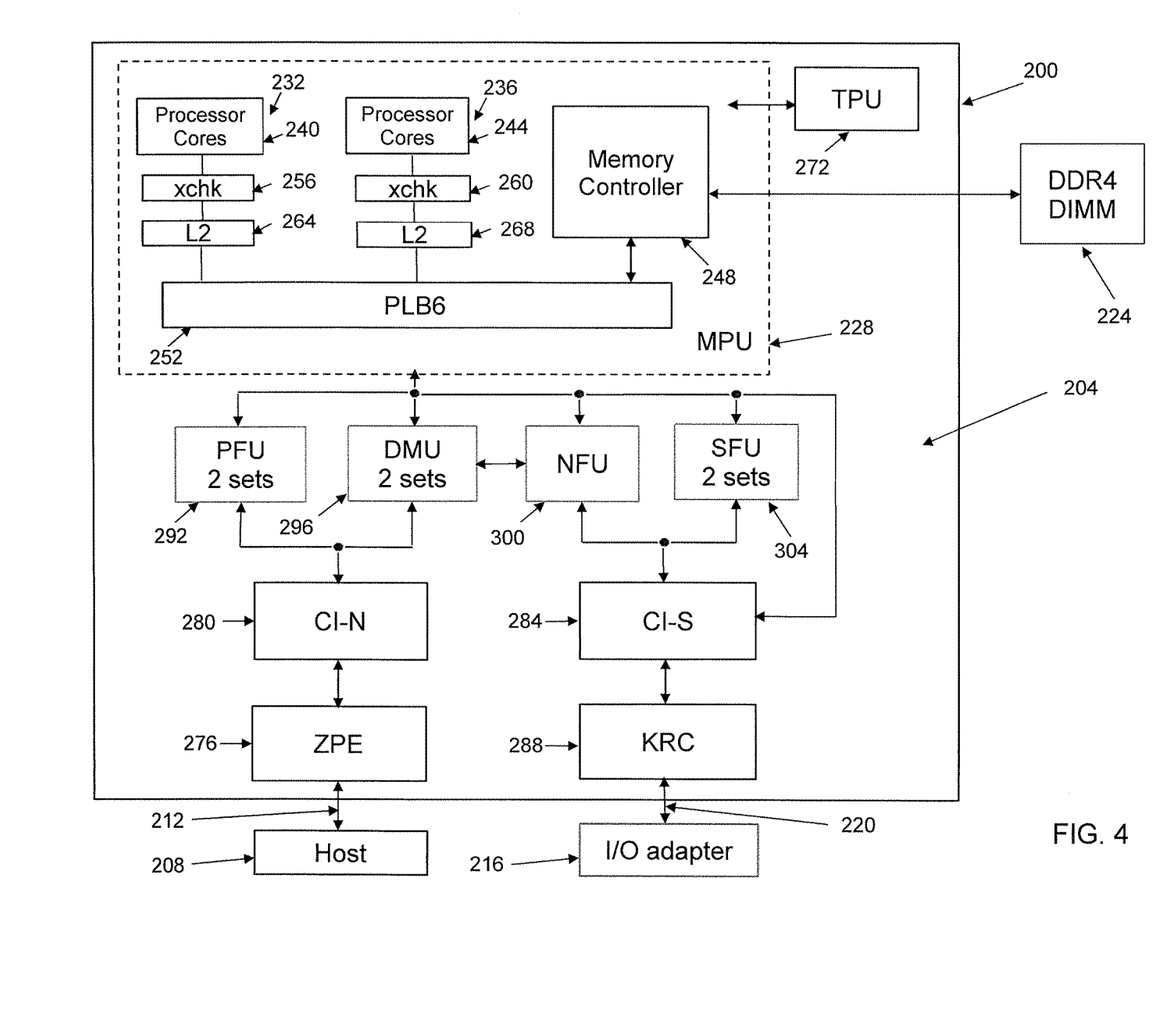
FIG. 4 is a block diagram of an integrated circuit containing a dual physical channel PCHID hardware architecture in accordance with one or more embodiments of the present invention.

Referring now to FIG. 4, there illustrated is a block diagram of an integrated circuit (e.g., an application specific integrated circuit—ASIC) 200 containing a dual physical channel PCHID device hardware architecture 204, along with other components connected with the ASIC 200, in accordance with one or more embodiments of the present invention. In exemplary embodiments, the dual channel PCHID hardware architecture 204 may comprise a Kraken-type dual physical channel PCHID hardware architecture. However, embodiments of the present invention are not limited as such in that the dual physical channel PCHID hardware architecture 204 of FIG. 4 may comprise other types of PCHID architectures besides the Kraken-type. Also, embodiments of the present invention are not limited to an ASIC type of integrated circuit (IC). Other types of ICs besides an ASIC 200 may be utilized in various embodiments of the present invention. Further, more than one IC may be utilized to embody all of the various hardware features of the dual physical channel PCHID hardware architecture 204 as shown in FIG. 4. The resulting plurality of ICs may, for example, be mounted on one or more printed circuit boards (PCBs).

The hardware architecture 204 illustrated in FIG. 4 contains the various functional logic circuits that make up the dual channel PCHID configuration in accordance with embodiments of the present invention. In the discussion that follows, those functional logic circuits shown in FIG. 4 that are specific to the PCHIDs are indicated at such, while those functional logic circuits that are "common" and not specific to the PCHIDs are indicated as such.

In embodiments of the present invention, the Kraken ASIC 200 connects with an external host system 208 (i.e., external to the ASIC 200), which may comprise any type of processor or computer, including a personal computer or a mainframe computer, which may be located within a network that may reside in the cloud, such as the cloud computing environment 50 described hereinabove and illustrated in FIGS. 1 and 2. In other embodiments, the processor or computer may reside on a computer system or processing system, such as the processing system 100 described hereinabove and illustrated in FIG. 3, or may reside in some other type of computing or processing environment. The communication connection 212 between the host system 208 and the ASIC 200 may comprise, for example, the Peripheral Component Interconnect Express (PCIe) high-speed serial computer expansion bus with eight data lines; hence the designation PCIe ×8 for this communication bus 212. Also, the host system 208 may be referred to as the central electronic complex (CEC).

The ASIC 200 may also connect with an external input/output (I/O) adapter 216, which may comprise a PCIe adapter for communication with the ASIC 200 through a PCIe ×8 bus 220. In addition, the ASIC 200 may connect with an external Double Data Rate 4th Generation Dual In-line Memory Module (DDR4 DIMM) 224. A dual in-line memory module 224 is a double SIMM (single in-line memory module). Similar to a SIMM, the DIMM 224 is a module containing one or more random access memory (RAM) chips or ICs that may be located on a small circuit board with pins that connect to a computer motherboard. As discussed in more detail hereinafter, the DIMM 224 stores the firmware code for operation of the two PCHIDs embodied within the hardware architecture 204 and in accordance with initialization and recovery processes or methods of embodiments of the present invention, as described in greater detail hereinafter with respect to the methods illustrated in the flow diagrams of FIGS. 5 and 6.

In embodiments of the present invention, the hardware architecture 204 also includes a multi-processor unit (MPU) 228. The MPU 228 may include two processor complexes 232, 236, with two power processor cores (PPCs) 240, 244 for each processor complex 232, 236. Each processor complex 232, 236 comprises PCHID specific logic.

The MPU 228 also includes a memory controller 248 that connects with the DIMM 224. The memory controller 248, which is part of the common logic on the ASIC 200, also connects with a PLB6 bus controller 252, which is also part of the common logic on the ASIC 200. The ASIC 200 may use a PLB6 bus as the system bus. The PLB6 bus typically includes seven masters and eight slave segments.

In addition, the MPU 228 includes a pair of crosscheck (xchk) logic circuits 256, 260. Each crosscheck logic circuit 256, 260 comprises PCHID specific logic. The checking performed by each crosscheck circuit 256, 260 may be performed on all outputs of the PPC cores 240, 244. Each cross check logic circuit 256, 260 also serves as a multiplexer (mux) and sends the outputs from its respective PPC core 240, 244 to the rest of the hardware logic circuits within the architecture 204.

Further, the MPU 228 includes a pair of two-level instruction caches (I-Cache) 264, 268, which comprise PCHID specific logic. That is, each I-cache 264, 268 contain a first level cache L1 and a second level cache L2, both of which store instructions to be executed by the corresponding PPC core 240, 244. In FIG. 4, these two caches 264, 268, which connect with the PLB6 bus via the PLB6 bus controller 252, are each labeled as "L2." In operation, the second level L2 cache feeds the first level L1 cache, which feeds the corresponding processor core 240, 244.

Outside of the MPU 228, the hardware architecture 204 also includes a test pervasive unit (TPU) 272, a portion of the internal logic of which comprises common logic and another portion of which comprises PCHID specific logic. The TPU 272 includes logic that carries out various functions such as, for example, ASIC power-up debugging, logging, test, and characterization system resets and initialization.

In embodiments of the present invention, the hardware architecture 204 located on the ASIC 200 of FIG. 4 also includes a ZPE (System-Z PCIe Endpoint) 276, which comprises common logic. The ZPE 276 is used when the external host system 208 comprises the IBM System-Z processor. The ZPE 276 is the main interface to the host 208 and carries the bulk of the commands and data back and forth over the PCIe ×8 bus 212 between the host 208 and the hardware architecture 204 on the ASIC 200. The capability and capacity of the ZPE interface 276 largely defines the limits of the overall capability and performance of the PCHIDs on the ASIC 200.

The ZPE 276 connects with one of two central interconnect functional logic circuits: CI-N (Central Interconnect North) 280 and CI-S (Central Interconnect South) 284. Specifically, the ZPE 276 connects with the CI-N 280 logical circuit, wherein the CI-N 280 is common to the two PCHIDs within the hardware architecture 204.

The CI-N 280 and the CI-S 284, which both comprise common logic, each comprise a version of CI (Central Interconnect) based on the basic CI component that is reduced in function and size. The basic idea of a CI circuit is to fan-in and fan-out a number of CI's down to a single CI.

The CI-S (Central Interconnect South) logical circuit 284 connects with a KRC (Kraken Root Complex) logical circuit 288, which is common logic. In embodiments of the present invention, the KRC circuit 288 comprises the main interface to the PCI-e I/O adapter 216 which performs the actual IO operations associated with the dual PCHIDs on the ASIC 200. The capability and capacity of the KRC interface circuit 288 define the nature of the I/O support that the dual PCHIDs can provide via operations and performance.

The CI-N circuit 280 also connects with a Programmable Function Unit (PFU) 292, which comprises PCHID specific logic. The PFU 292 may comprise two sets of components that support a number of PSE's (Programmable Sequencer Elements) for a single channel or port of traffic. The PFU 292 also connects with the MPU 228 via the PLB6 bus by way of the PLB6 bus controller 252. The PFU 292 may also store a portion of the firmware code for operation of the two PCHIDs embodied within the hardware architecture 204 and in accordance with initialization and recovery processes or methods of embodiments of the present invention, as described in greater detail hereinafter with respect to FIGS. 5 and 6.

In addition, the CI-N circuit 280 also connects with a Data Mover Unit (DMU) 296, which comprises PCHID specific logic. The DMU 296 may comprise two sets of components that also connect with the MPU 228 via the PLB6 bus by way of the PLB6 bus controller 252.

There are three major classes of operations performed with the DMU 296. The first class of operations is to transfer large blocks of data between the host system's memory and switch address mapped space. The second class of operations is to pass control information between the ASIC 200 and the CEC or host system 208. The hardware used to transfer large data blocks is referred to as a Data Mover, while the operations that move data are referred to as Data Mover Queue (DMQ) operations. The hardware used to pass control information is called the Register Operation engine, while the operations are referred to as Register Operations. The third class of operations involves a queued method to transfer control block information between switch address mapped space and the CEC or host system 208. These are typically referred to as Control Block Queue entries.

In embodiments of the present invention, the hardware architecture 204 of the ASIC 200 also includes a Networking Function Unit (NFU) 300, which comprises PCHID specific logic. The NFU 300, which may comprise a single set of components, contains all the functions needed to support the OSA (Ethernet) networking protocols. The NFU 300 also connects with the MPU 228 via the PLB6 bus by way of the PLB6 bus controller 252. Also, the NFU 300 connects with the CI-S (Central Interconnect South) logical circuit 284.

The hardware architecture 204 further includes a Storage Function Unit (SFU) 304, which comprises PCHID specific logic. The SFU 304, which may comprise two sets of components, contains all the functions needed to support the known Ficon (Fiber Connection) and FCP (Fiber Channel Protocol) protocols. The SFU 304 also connects with the MPU 228 via the PLB6 bus by way of the PLB6 bus controller 252. Also, the SFU 304 connects with the CI-S (Central Interconnect South) logical circuit 284.

Figure 5:
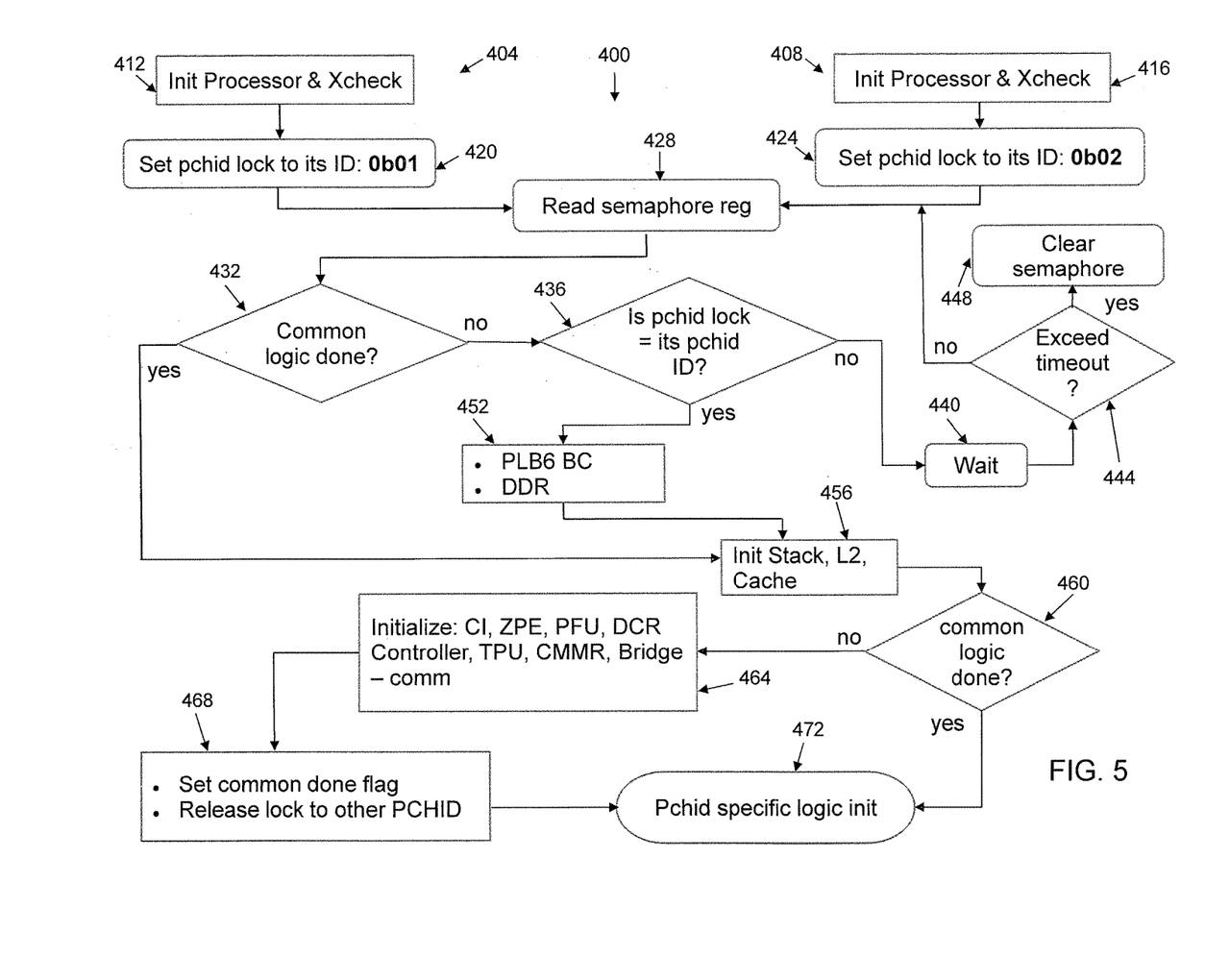
FIG. 5 is a flow diagram of a method for initialization of the functional hardware logic within the integrated circuit of FIG. 4 containing the dual physical channel PCHID hardware architecture in accordance with one or more embodiments of the present invention.

Referring now to FIG. 5, there illustrated is a flow diagram of a method 400 according to one or more embodiments of the present invention for initialization of the hardware logic (i.e., both the common logic and the PCHID specific logic) within the ASIC 200 of FIG. 4 containing the dual physical channel PCHID hardware architecture 204. In exemplary embodiments, the method 400 may be embodied as firmware (i.e., software embedded within the DIMM 224 of FIG. 4) that is executed by the aforementioned functional logic circuits within the hardware architecture 204 on the ASIC 200. Also, in exemplary embodiments a combination of a firmware and a hardware locking mechanism is used to coordinate with and which PCHID gets to initialize the common logic.

The following initialization method provides a solution for initialization of the dual physical channel PCHID hardware architecture 204; more specifically, the initialization of both the logic that is common and the logic that is PCHID specific. For example, a combination firmware and hardware locking mechanism may be used to coordinate when and which one of the PCHIDs is able to initialize the common logic. A "winner" is referred to as the PCHID that initializes the common logic, while the "loser" is referred to as the PCHID that initializes only its specific logic.

More specifically, the flow diagram of the method 400 of FIG. 5 illustrates the firmware flow starting when the processors 240, 244 (FIG. 4) are let out of a reset condition. The two PCHIDs can go into operation independently or concurrently. FIG. 5 also illustrates the different hardware components that are initialized by the firmware. In exemplary embodiments, only one of the two PCHIDs can be the winner by obtaining a hardware lock even when both PCHIDs start off simultaneously.

The initial operations 404 on the left side of FIG. 5 are related to a first one of the two PCHIDs (e.g., PCHID A), while the initial operations 408 on the right side of FIG. 5 are related to a second one of the two PCHIDs (e.g., PCHID B).

In an operation in block 412, the processor cores 240, 244 and crosscheck logic 256, 260 for one of the two PCHIDs are initialized. Similarly, in an operation in block 416, the processor cores 240, 244 and crosscheck logic 256, 260 for the other one of the two PCHIDs are initialized. In an operation in block 420, a hardware lock for one of the two PCHIDs may or may not be set to its ID, depending on whether or not that particular PCHID is the "winner" or the "loser." This operation is similar for the other PCHID in an operation in block 424.

In an operation in block 428, a semaphore register is read, and in an operation in block 432 a check is made as to whether or not the common logic has been initialized. If not, in an operation in block 436 a check is made as to whether or not the PCHID lock equals its PCHID ID. If not, in an operation in block 440 a wait occurs for a predetermined period of time, then a check is made in an operation in block 444 as to whether the time period has exceeded a timeout period of time threshold. If not, the method branches back to the read semaphore register operation in block 428. If so, then the semaphore register is cleared in an operation in block 448. Also, this may indicate an error condition that stops the initialization method 400 of FIG. 5. The host 208 may then decide whether or not to restart the initialization method 400.

The semaphore register is an important aspect for coordinating dual PCHIDs flow. The content of the register is the lock ID for its PCHID (PCHID-A=01, PCHID-B=02). For example, in the initialization method 400 of the flow diagram of FIG. 5, when the winner PCHID arrives to the point of initializing the common logic, it sets the lock which is a hardware atomic operation, and would then continue to initialize the common logic. The loser PCHID would see that the lock is not set to its own ID and would wait until the winner releases the lock and skips over any common logic initialization. The common logic must be only be initialized by one of the two PCHIDs.

If, as a result of the operation in block 436, the PCHID lock does equal its PCHID ID, then the PLB6 bus controller 252 and the DDR memory controller 248 (FIG. 4) are configured as part of the common logic in an operation in block 452. Then, in an operation in block 456, the stack, the L2 cache 264, 268, and the PCHID cache setting are initialized. In an operation in block 460, a check is made as to whether or not the common logic has been initialized. If not, in an operation in block 464 the remaining common logic is initialized. This includes the CI-N 280 and the CI-S 284, the ZPE 276, the PFU 292, the DCR controller (which is a hardware function that access all registers in the ASIC 200), the TPU 272, the CMMR (Central Memory Mapped Registers, which provides memory read and write access to various user registers, wherein Memory Mapped operations are more efficient than DCR operations due to posted writes), and Bridge-comm (the Kraken ASIC 200 typically has several bridges to convert existing protocols and legacy switches to PLB6 Masters and Slaves).

Next, in an operation in block 468, the common logic done or finished flag is set, and the lock to the other PCHID is released so that the loser PCHID can get out of the wait loop of the operation in block 440 if the loser PCHID was waiting for the winner PCHID to finish. Then, in an operation in block 472, the method 400 finishes initializing its PCHID hardware and firmware specific logic. If, as a result of the operation in block 460, it is determined that the common logic has been initialized, then the operation in block 472 is performed.

Still referring to the flow diagram of the method 400 of FIG. 5, a specific embodiment of the present invention may comprise one in which the "winner" PCHID performs common logic initialization, sets its lock and common logic done flag, and then finishes its PCHID specific logic. In this exemplary embodiment, the firmware execution flow through the flow diagram of FIG. 5 starts with PCHID A initializing its processor cores and crosscheck logic in the operation in block 412, followed by the PCHID A setting its lock to its ID (e.g., 0b01) in the operation in block 420, followed by the semaphore register being read in the operation in block 428.

This is followed by the determination being made in the block 432 that the common logic done flag is not set in the operation in block 432 because PCHID A is the "winner," which is followed by the operation in block 436 determining that the PCHID lock equals its PCHID ID (i.e. the lock is set) because PCHID A is the "winner," followed by the operation in block 452 in which the PLB6 bus controller 252 and the DDR memory controller 248 are configured as part of the common logic. This is followed by the operation in block 456 in which the stack, the L2 cache 264, 268, and the PCHID cache setting are initialized, which is followed by the operation in block 460 determining that the common logic flag is not set because not all of the common logic has been initialized. This is followed by the operation in block 464 is which the remaining common logic is initialized, followed by the operation in block 468 in which the common logic done or finished flag is set, and the lock to the other PCHID is released so that the loser PCHID can get out of the wait loop of the operation in block 440 if the loser PCHID was waiting for the winner PCHID to finish. Finally, the operation in block 472 is executed in which PCHID A finishes initializing its PCHID hardware and firmware specific logic.

Still referring to the flow diagram of the method 400 of FIG. 5, another specific embodiment of the present invention may comprise one in which the "loser" PCHID (e.g., PCHID B) only initializes its PCHID specific logic. In this exemplary embodiment, the firmware execution flow through the flow diagram of FIG. 5 starts with PCHID B initializing its processor cores and crosscheck logic in the operation in block 416, followed by the PCHID B failing to set its lock to its ID in the operation in block 424. PCHID B cannot set its lock because in this exemplary embodiment PCHID A is the "winner" and, as such, the winner "owns" the lock. This is followed by the semaphore register being read in the operation in block 428.

This is followed by the determination being made in the block 432 that the common logic done flag is set in the operation in block 432 (again because PCHID A is the "winner"). As such, the method 400 can then branch to the operation in block 456 in which the stack, the L2 cache 264, 268, and the PCHID cache setting are initialized, which is followed by the operation in block 460 determining that the common logic flag is set because all of the common logic has already been initialized by PCHID A. This is followed by the operation in the block 472 in which PCHID B finishes initializing its PCHID hardware and firmware specific logic.

Another exemplary embodiment of the present invention comprises one in which a "loser" PCHID (e.g., PCHID B), has to wait for the "winner" PCHID A to finish initializing the common logic. This is similar to the prior embodiment just described in that this embodiment also starts out by executing the operations in blocks 416, 424, 428 and 432. However, as a result of the operation in block 432, the common logic flag is not set because PCHID A has not yet finished initializing the common logic. Thus, the operation in block 436 is executed in which it is determined that the "winner" still has the lock, which is followed by the wait operation in block 440, and the check operation in block 444 for a timeout condition which, if the timeout has occurred, the semaphore register is cleared and an error is reported to the host 208. As such, the upper level firmware code will retry from the reset again to attempt to restart the entire flow of the method 400 within the flow diagram of FIG. 5. If instead it is determined in the operation in block 444 that the timeout has not occurred, then the method 400 branches back to the operation in block 428 in which the semaphore register is read.

Figure 6:
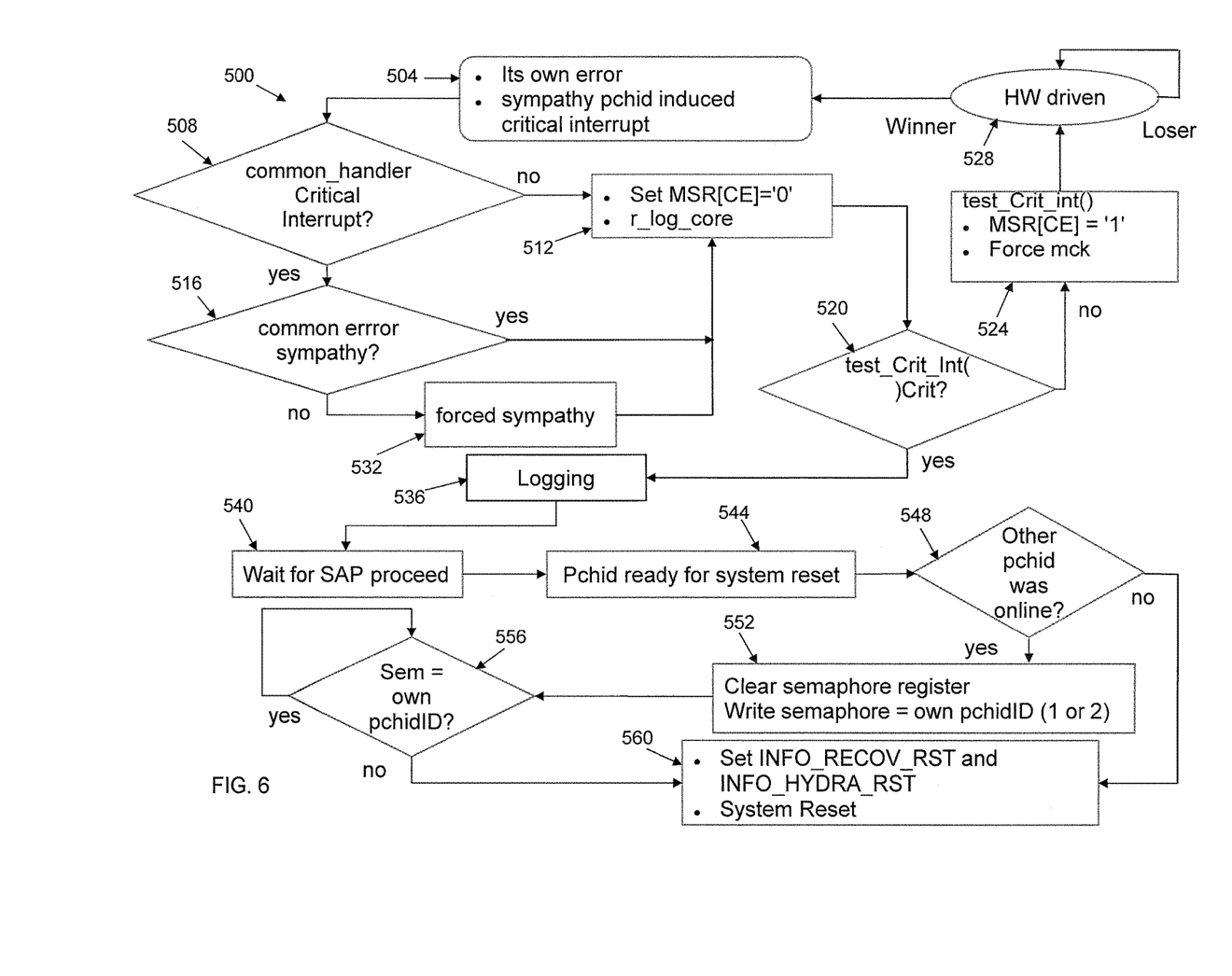
FIG. 6 is a flow diagram of a method for recovery of the functional hardware logic within the integrated circuit of FIG. 4 containing the dual physical channel PCHID hardware architecture in accordance with one or more embodiments of the present invention.

Referring now to FIG. 6, there illustrated is a flow diagram of a method 500 according to one or more embodiments of the present invention for recovery of the hardware logic within the ASIC 200 of FIG. 4 containing the dual physical channel PCHID hardware architecture 204. In exemplary embodiments, similar to the method 400 of the flow diagram of FIG. 5, the method 500 of the flow diagram of FIG. 6 may be embodied as firmware (i.e., software embedded within the DIMM 224 of FIG. 4) that is executed by the aforementioned functional logic circuits within the hardware architecture 204 on the ASIC 200.

In a method for recovery from an error in the dual physical channel PCHID hardware architecture 204 of FIG. 4, if an error is triggered by the common logic, then it is typical that both PCHIDs go through an error recovery process or method. However, in a Kraken type of dual physical channel PCHID hardware architecture 204, if only one PCHID triggers an error condition, then both PCHIDs still go through the error recovery process or method.

The recovery method 500 of the flow diagram of FIG. 6 provides a solution for recovery from both common and PCHID specific errors in a dual physical channel PCHID hardware architecture 204. This is done by taking the "sympathy" PCHID (i.e., the one of the two PCHIDs that is not currently experiencing an error condition) into recovery and synchronization before system reset occurs. Thus, the following recovery method combines firmware and various hardware logic features (e.g., hardware locks, error-action, "force sympathy," etc.) to synchronize the dual PCHIDs recovery actions for various error and timing scenarios. Handling of the different error and timing scenarios is an important aspect for the dual independent channels PCHID design.

There are four main types of errors that may occur in a dual channel PCHID configuration such as that of the hardware architecture 204 of FIG. 4. A first type of error is a common logic error. In a simplified scenario of such an error, both PCHIDs would go into recovery at the same time triggered by the Kraken ASIC 200 hardware logic. There is relatively little coordination needed to be performed by the firmware, except that one PCHID must wait until the other PCHID finished its recovery action and then one of the PCHID will issue a system reset. This coordination utilizes a hardware lock mechanism.

A second type of error is a PCHID specific logic error (i.e., the error occurs in only one of the PCHID specific hardware logic). In this error situation, if one PCHID takes on an error, the other PCHID would still be running until the at-fault PCHID applies the "force sympathy PCHID bit" in firmware, thereby triggering the hardware to direct the sympathy (not-at-fault) PCHID to go into recovery. Then the same coordination technique is used as above on synchronizing the system reset.

A third type of error is a PCHID specific error on both PCHIDs. In this error situation, the hardware Action-Lock logic in the Kraken ASIC 200 only allows a single error to be locked from either PCHID, thus only causing a single PCHID to go into recovery (i.e., the hardware generates a critical signal to the processors). Again, the firmware applies a "force sympathy" to allow the at-fault PCHID to take down the sympathy PCHID to go into recovery. Although the partner PCHID is categorized as a "sympathy" PCHID, it still logs its own PCHID specific error data in case it helps with original problem determination. Most of the time it's not relevant because the Action-Lock error is the first error.

The fourth type of error is a processor exception on a single PCHID or on both PCHIDs (e.g., a code bug, a non-hardware ASIC error, etc.). In this error situation, the at-fault PCHID would go into recovery trigged by the processor (and not by the Kraken ASIC 200). To avoid taking on additional critical errors, the firmware utilizes a forced machine check provided by the hardware to block further interrupts. The firmware also uses the "force sympathy" to take down the not-at-fault PCHID through recovery.

Referring to the flow diagram of FIG. 6, there illustrated are the various steps taken by embodiments of the present invention for recovery of one or both of the PCHIDs during different error situations. These various steps include initialization of certain variables, checks for the existence of certain conditions, and other steps which should be apparent to one of ordinary skill in the art in light of the teachings herein.

These various error situations will now be described, each with reference to a flow of the operations shown in the various blocks in FIG. 6. The following errors occur with both PCHIDs online. A first error is when both PCHIDs hit a common error. Assume the flow of recovery of the PCHID A is slightly ahead in time of that of PCHID B for ease of illustration (i.e., could be vice versa, or exact flow of recovery for both PCHIDs). Now, we have PCHID A executing the operations in the various blocks shown in FIG. 6 in the following order: 504, 508, 516, 512, 520, 536, 540, 544, 548, 552, 556, and 560. Also, PCHID B executes the operations in the following order: 504, 508, 516, 512, 520, 536, 540, 544, 548, 552, and 556.

The next error scenario is when both PCHIDs hit the same or a different PCHID specific error. The TPU's action lock logic allows only one PCHID entering into an action (aka critical interrupt); thus, if both PCHIDs took on an error at the same time, only one would enter recovery. In the following example, assume PCHID A is the "action winner." PCHID A executes the operations in FIG. 6 in the following order: 504, 508, 516, 532, 512, 520, 536, 540, 544, 548, 552, 556, and 560. Also, PCHID B executes the operations in the following order: 504, 508, 516, 512, 520, 536, 544, 548, 552, and 556.

The next error scenario is when both PCHIDs hit a processor exception at the same time. Assume PCHID A is the "winner" (as indicated in the operation in block 528). PCHID A executes the operations in FIG. 6 in the following order: 504, 508, 512, 520, 524, 504, 508, 516, 532, 512, 536, 540, 544, 548, 552, 556, and 560. Also, PCHID B executes the operations in the following order: 504, 508, 512, 520, 524, 528 and remain there in a spin loop until PCHID A returns back to 532 to forced sympathy, which will trigger PCHID B back to 504, 508, 516, 512, 520, 536, 540, 544, 548, 552, and 556. The race condition is resolved by HW by allowing only 1 PCHID sense the forced mchk [524] even if both side arrive 524 at the exact same time.

Other error situations for when both PCHIDs are online or for when only one PCHID is online, and their accompanying solutions which comprise a flow of the operations in the blocks in the flow diagram of FIG. 6 should be apparent to one of ordinary skill in the art in light of the teachings herein. When handling these various error situations, sometimes the handling timing aspects of the recovery process utilizes becomes an important factor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    operating, by a processor, first and second physical channel identifier (PCHID) devices comprised of a plurality of functional logic components, wherein one or more of the functional logic components are specific to one or more of the first and second PCHIDs and wherein one or more of the functional logic components are in common and not specific to one or more of the first and second PCHIDs;
    determining, by the processor, that an error condition exists in the first PCHID or the second PCHID;
    executing, by the processor, a recovery method to remove the error condition from the first PCHID or the second PCHID in which the error condition exists; and
    executing, by the processor, an initialization method for both of the first and second PCHIDs.

2. The computer-implemented method of claim 1 wherein the plurality of functional logic components are embodied in an application specific integrated circuit (ASIC).

3. The computer-implemented method of claim 2 wherein the ASIC is a Kraken type ASIC.

4. The computer-implemented method of claim 2 wherein the ASIC is configured to connect with a host computer, an input/output adapter, and a memory module.

5. The computer-implemented method of claim 1 wherein the recovery method is embodied in firmware that is stored within a memory module.

6. The computer-implemented method of claim 1 wherein the initialization method is embodied in firmware that is stored within a memory module.

7. The computer-implemented method of claim 1 wherein the initialization method controls a hardware locking mechanism to coordinate an initialization of one or more of the functional logic components that are in common and not specific to one or more of the first and second PCHIDs.

8. A system comprising:

a processor in communication with one or more types of memory, the processor configured to:

operate first and second physical channel identifier (PCHID) devices comprised of a plurality of functional logic components, wherein one or more of the functional logic components are specific to one or more of the first and second PCHIDs and wherein one or more of the functional logic components are in common and not specific to one or more of the first and second PCHIDs;

determine that an error condition exists in the first PCHID or the second PCHID;

execute a recovery method to remove the error condition from the first PCHID or the second PCHID in which the error condition exists; and execute an initialization method for both of the first and second PCHIDs.

9. The system of claim 8 wherein the plurality of functional logic components are embodied in an application specific integrated circuit (ASIC).

10. The system of claim 9 wherein the ASIC is a Kraken type ASIC.

11. The system of claim 9 wherein the ASIC is configured to connect with a host computer, an input/output adapter, and a memory module.

12. The system of claim 8 wherein the recovery method is embodied in firmware that is stored within a memory module.

13. The system of claim 8 wherein the initialization method is embodied in firmware that is stored within a memory module.

14. The system of claim 8 wherein the initialization method controls a hardware locking mechanism to coordinate an initialization of one or more of the functional logic components that are in common and not specific to one or more of the first and second PCHIDs.

15. A computer program product comprising:

a storage medium readable by a processing circuit and storing instructions for execution by the processing circuit for performing a method comprising:

operating first and second physical channel identifier (PCHID) devices comprised of a plurality of functional logic components, wherein one or more of the functional logic components are specific to one or more of the first and second PCHIDs and wherein one or more of the functional logic components are in common and not specific to one or more of the first and second PCHIDs;

determining that an error condition exists in the first PCHID or the second PCHID;

executing a recovery method to remove the error condition from the first PCHID or the second PCHID in which the error condition exists; and executing an initialization method for both of the first and second PCHIDs.

16. The computer program product of claim 15 wherein the plurality of functional logic components are embodied in an application specific integrated circuit (ASIC).

17. The computer program product of claim 16 wherein the ASIC is a Kraken type ASIC.

18. The computer program product of claim 16 wherein the ASIC is configured to connect with a host computer, an input/output adapter, and a memory module.

19. The computer program product of claim 15 wherein the recovery method is embodied in firmware that is stored within a memory module, and wherein the initialization method is embodied in firmware that is stored within the memory module.

20. The computer program product of claim 15 wherein the initialization method controls a hardware locking mechanism to coordinate an initialization of one or more of the functional logic components that are in common and not specific to one or more of the first and second PCHIDs.

* * * * *